No. 710,850. Patented Oct. 7, 1902.
F. P. DOLEN.
HOSE COUPLING.
(Application filed May 24, 1902.)
(No Model.)
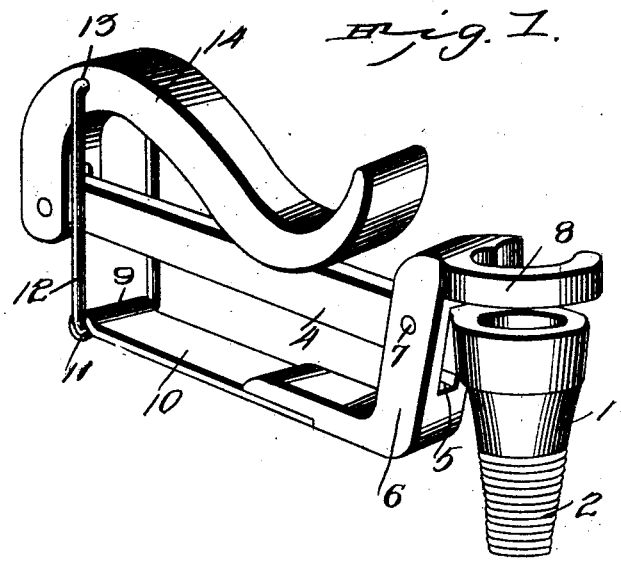
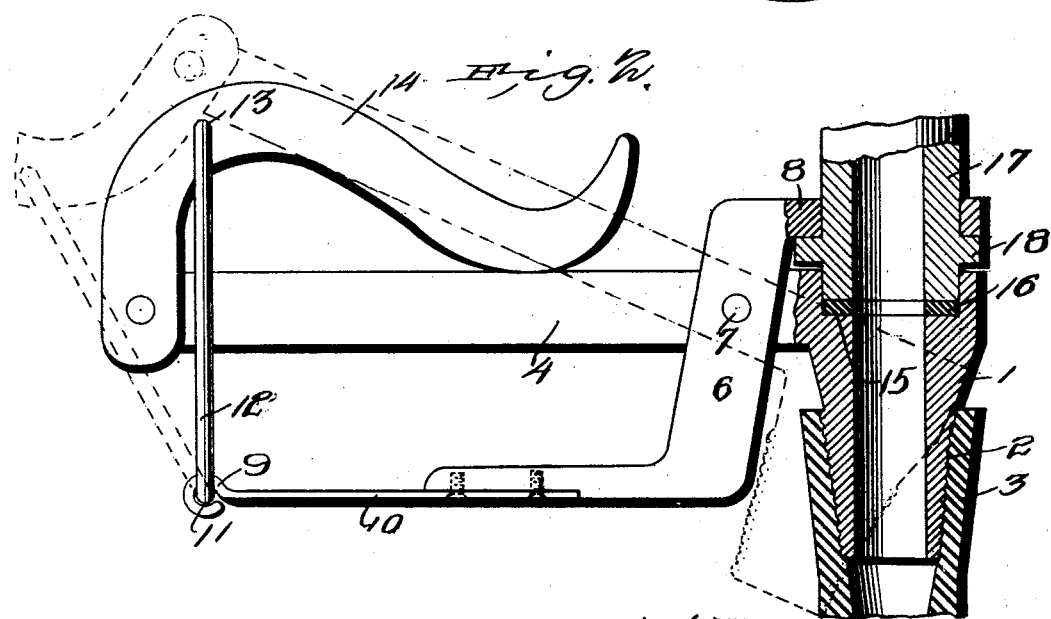
Witnesses
F. P. Dolen, Inventor
by C. A. Snow & Co.
Attorneys

UNITED STATES PATENT OFFICE.

FELIX P. DOLEN, OF SUTHERLAND SPRINGS, TEXAS.

HOSE-COUPLING.

SPECIFICATION forming part of Letters Patent No. 710,850, dated October 7, 1902.

Application filed May 24, 1902. Serial No. 108,847. (No model.)

*To all whom it may concern:*

Be it known that I, FELIX P. DOLEN, a citizen of the United States, residing at Sutherland Springs, in the county of Wilson and State of Texas, have invented a new and useful Hose-Coupling, of which the following is a specification.

This invention relates to hose-couplings; and it has for its object to provide a device of this class by means of which a hose may be very quickly and effectively placed in engagement with and held upon the nozzle of a hydrant, thus making the device very available for fire-hose and the like, where it is important to effect a secure coupling or connection between the hose and hydrant in the very shortest space of time possible.

With this end in view my invention consists in the improved construction, arrangement, and combination of parts, which will be hereinafter fully described, and particularly pointed out in the claims.

In the accompanying drawings, Figure 1 is a perspective view of the device constituting my improved hose-coupling. Fig. 2 is a plan view, partly in section, showing the device in position upon the nozzle of a hydrant for the purpose of connecting the hose therewith.

Corresponding parts in both figures are indicated by like characters of reference.

1 designates a tubular sleeve, preferably made tapering, as shown, and having annular corrugations 2, formed upon its tapering end, adapted to engage a hose 3 and to hold the latter securely when it is placed in position upon the said tubular sleeve, as shown in Fig. 2. Additional fastening means may be used; but such have not been shown in the drawings, as they form no part of my invention.

The sleeve 1 is provided with a laterally-extending arm 4, which extends through a slot 5 in a plate 6, with which the said arm 4 has pivotal connection by means of a pin 7. The plate 6 is provided at one end with a U-shaped clamp 8, adapted to be placed in engagement with a hydrant-nozzle by embracing the said nozzle. The said clamp 8 extends laterally from the plate 6 in such a position as to be directly opposed to the broad end of the sleeve 1. At its opposite end the plate 6 is provided with an oppositely-extending arm 9.

10 designates a stout leaf-spring which is firmly secured to the arm 9 in such a manner as to form an extension thereof. The outer free end of the spring 10 is bent to form a recess 11, in which is pivotally mounted a link 12. The free end of said link has pivotal connection with the fulcrum 13 of a crank-lever 14, the short part of which has pivotal connection with the outer end of the arm 4. The long arm of the lever 14 is curved so as to form a handle, by means of which it may be conveniently manipulated and which when the device is in operative position, with the free end of the link 13 slightly past its pivotal point or center, rests against the said arm 4, as will be clearly seen in Fig. 2 of the drawings.

The broad end of the sleeve 1, which in practice engages the hydrant-nozzle, is provided with an interior shoulder 15, forming a seat upon which a washer 16 may be placed to effect a tight joint between the said nozzle and the coupling. The hydrant-nozzle, which is designated by 17, should also in order to coöperate with my invention be provided with an annular flange 18, as shown in Fig. 2 of the drawings.

The operation of my invention and its advantages will be readily understood from the foregoing description, taken in connection with the drawings, hereto annexed. The device, as will be seen, is permanently connected with the hose in connection with which it is to be used. In order to effect the coupling between the hose and the hydrant, the lever 14 is swung to the position indicated in dotted lines in Fig. 2 of the drawings, thus separating the sleeve 1 from the U-shaped clamp 8 and enabling the latter to be adjusted in position behind the flange 18 of the hydrant-nozzle. By manipulating the lever 14 the parts are again brought together, thus causing the sleeve 1 to engage the end of the hydrant-nozzle, which is made to fit in the broad end of said sleeve, the washer 16 serving to make a tight joint. The spring 10 will yield sufficiently to enable the fulcrum of the lever 14 to be carried slightly past the center, when the curved end of said lever will engage against the bar 4, and the device thus be locked in position. To remove the device, the operation is simply reversed.

By the use of this device the coupling between a hose and a hydrant-nozzle may be effected in an extremely short space of time and a thoroughly efficient connection will be established.

Having thus described my invention, I claim and desire to secure by Letters Patent of the United States—

1. In a hose-coupling, the combination of a tubular sleeve having a laterally-extending arm, a plate having pivotal connection with said arm and provided at one end with a U-shaped clamp facing the sleeve and at the other end with an oppositely-extending arm, a link having pivotal and flexible connection with said arm, and a crank-lever fulcrumed upon the free end of said link and having pivotal connection at the end of its short arm with the other end of the arm extending from the tubular sleeve, substantially as set forth.

2. In a hose-coupling, the combination of a tubular sleeve having a laterally-extending arm, a slotted plate connected pivotally with said arm adjacent to said sleeve and having at one end a U-shaped clamp facing the latter and at its other end an oppositely-extending arm, a spring rigidly secured to said arm, a link connected pivotally with said spring, a crank-lever fulcrumed upon said link and having its long arm curved to form a handle adapted to rest against the arm extending from the tubular sleeve, and a pivotal connection between the said arm and the short arm of the crank-lever, substantially as set forth.

3. In a hose-coupling, the combination of two pivotally-connected members one of said members having a tubular sleeve connected with a hose, and the other of said members having a U-shaped clamp adapted to engage a flanged hydrant-nozzle, a spring forming part of one of said members, and means for manipulating the said pivoted members and for locking them together, substantially as set forth.

In testimony that I claim the foregoing as my own I have hereto affixed my signature in the presence of two witnesses.

FELIX P. DOLEN.

Witnesses:
W. C. CRAIGHEAD,
S. H. BURRIS.